United States Patent
Cattaneo et al.

(10) Patent No.: US 12,502,266 B2
(45) Date of Patent: Dec. 23, 2025

(54) MEDICAL DEVICE, IN PARTICULAR A FLOW DIVERTER, AND KIT

(71) Applicant: Acandis GmbH, Pforzheim (DE)

(72) Inventors: Giorgio Cattaneo, Karlsruhe (DE); Andreas Schüssler, Pfinztal (DE)

(73) Assignee: Acandis GmbH, Pforzheim (DE)

(*) Notice: Subject to any disclaimer, the term of this patent is extended or adjusted under 35 U.S.C. 154(b) by 651 days.

(21) Appl. No.: 17/433,923

(22) PCT Filed: Feb. 19, 2020

(86) PCT No.: PCT/EP2020/054294
§ 371 (c)(1),
(2) Date: Aug. 25, 2021

(87) PCT Pub. No.: WO2020/173765
PCT Pub. Date: Sep. 3, 2020

(65) Prior Publication Data
US 2022/0047373 A1 Feb. 17, 2022

(30) Foreign Application Priority Data
Feb. 26, 2019 (DE) .................. 102019104828.1

(51) Int. Cl.
*A61F 2/06* (2013.01)
*A61F 2/82* (2013.01)
*A61F 2/90* (2013.01)

(52) U.S. Cl.
CPC .................. *A61F 2/06* (2013.01); *A61F 2/90* (2013.01); *A61F 2002/068* (2013.01);
(Continued)

(58) Field of Classification Search
CPC ........ A61F 2/90; A61F 2/06; A61F 2002/068; A61F 2002/823; A61B 17/12118
See application file for complete search history.

(56) References Cited

U.S. PATENT DOCUMENTS

| 2009/0177268 A1 | 7/2009 | Lundkvist et al. |
| 2011/0079315 A1* | 4/2011 | Norton ...................... A61F 2/90 |
| | | 140/71 R |

(Continued)

FOREIGN PATENT DOCUMENTS

| DE | 202014102531 U1 | 7/2014 |
| DE | 102015107291 A1 | 9/2015 |

(Continued)

OTHER PUBLICATIONS

German Office Action dated Dec. 19, 2019, Application No. DE102019104828.1.

(Continued)

*Primary Examiner* — Diane D Yabut
(74) *Attorney, Agent, or Firm* — Cesari and McKenna, LLP

(57) ABSTRACT

The invention is directed to a medical device, in particular a flow diverter, having a radially self-expandable lattice structure which is tubular at least in some regions and which is composed of a plurality of interwoven individual wires which form meshes of the lattice structure, wherein at least some of the individual wires have an X-ray visible core material and a superelastic mantle material, wherein a plurality of directly adjacent meshes in the circumferential direction of the lattice structure form a mesh ring in a fully self-expanded state, the lattice structure has an expansion diameter $D_{exp}$, the mesh ring has a mesh number n, and the core material has a core diameter $d_{core}$, and wherein for the core diameter $d_{core}$, the following holds:

$$d_{core} = f(D_{exp}/n)$$

wherein the following holds for a visibility factor f:

$0.08 \leq f \leq 0.15$.

19 Claims, 2 Drawing Sheets

(52) U.S. Cl.
   CPC . *A61F 2002/823* (2013.01); *A61F 2210/0014* (2013.01); *A61F 2250/001* (2013.01); *A61F 2250/0032* (2013.01); *A61F 2250/0039* (2013.01); *A61F 2250/0098* (2013.01)

(56) References Cited

U.S. PATENT DOCUMENTS

| | | |
|---|---|---|
| 2011/0160842 A1 | 6/2011 | Mayer |
| 2013/0325141 A1* | 12/2013 | Gill ...................... A61F 2/2418 623/23.7 |
| 2017/0128242 A1* | 5/2017 | Ding ........................ A61F 2/90 |

FOREIGN PATENT DOCUMENTS

| | | |
|---|---|---|
| DE | 202015105466 U1 | 11/2015 |
| DE | 102016119369 A1 | 4/2017 |
| EP | 2762622 A2 | 8/2014 |
| EP | 2247268 | 5/2016 |

OTHER PUBLICATIONS

PCT Notification of Transmittal of the International Search Report International Searching Authority, International Application No. PCT/EP2020/054294, mailed May 11, 2020, 4 pages.

\* cited by examiner

MEDICAL DEVICE, IN PARTICULAR A FLOW DIVERTER, AND KIT

CROSS REFERENCE TO RELATED APPLICATIONS

The present application is a National Stage of International Application No PCT/EP2020/054294, filed Feb. 19, 2020, which application claims priority to commonly owned German Patent Application No. 102019104828.1, filed on Feb. 26, 2019, which applications are incorporated herein by reference in their entirety.

TECHNICAL FIELD

The invention relates to a medical device, in particular a flow diverter, according to the preamble of patent claim 1. An example of a medical device of this type is known from EP 2 247 268 B1.

BACKGROUND

The known device has a radially expandable lattice structure which is tubular in some sections. The lattice structure is formed from a single wire which is interwoven with itself, whereupon meshes are formed. The wire of the lattice structure is produced from a composite material and in particular comprises an X-ray visible core material and a superelastic mantle material.

The known medical device is configured as a stent. The X-ray visible core material of the known stent is intended to enable the stent to be detected under radiographic monitoring. In contrast, the superelastic properties of the mantle material of the wire are intended to ensure that the stent expands autonomously, i.e. it is self-expandable.

Stents for the endovascular treatment of intracranial aneurysms guide the blood flow away from the diseased region of the vessel. Stents of this type are known as "Endoluminal Embolization Devices" or "flow diverters" and have a dense mesh system. By means of reconstruction of the original vessel wall and modification of the haemodynamic ratios in the aneurysm, in the long term, flow diverters seal off the aneurysm. Flow diverters are particularly suitable for therapy in complex aneurysms such as broad-based, fusiform or giant aneurysms which often cannot be treated using other methods.

In the context of further development of the known stent, it has been shown that it is difficult to obtain on the one hand a high X-ray visibility of the lattice structure and on the other hand good self-expandable capability, in particular when the lattice structure has to be suitable for feeding into small blood vessels, for example intracranial blood vessels. When feeding into small blood vessels, it is vital for the lattice structure to be compressed to a very small cross sectional diameter. However, this is made more difficult by a high proportion of X-ray visible material, because material of this type usually has a tendency to deform plastically. Thus, when the lattice structure expands in the blood vessel, contact of the lattice structure on the vessel wall could be poor. In contrast, superelastic materials have a high compressibility and during expansion, ensure that the lattice structure conforms correctly to the vessel.

For good visibility, it would be advantageous to raise the proportion of X-ray visible core material of the wire. In this manner, the entire lattice structure can be made visible, which is advantageous when having to check for proper conformity of the lattice structure with a vessel wall over its entire length. However, X-ray visible core materials do not have any superelastic properties and thus make barely any contribution to the expansion force which is necessary for the self-expansion of the lattice structure.

Particularly when feeding medical devices of this type into small blood vessels, preferably in the neurovascular region, self-expandability is desired, however, so that a balloon catheter for expanding the lattice structure can be dispensed with. A balloon catheter of this type would restrict the compression of the lattice structure, so that the lattice structure could not be introduced into particularly small blood vessels. Miniaturisation of the lattice structure, in particular in its compressed state, would therefore be desirable. Furthermore, a balloon catheter increases the risk of injury during subsequent manipulation.

A further factor which restricts the compressibility of the lattice structure is the diameter of the wire. This should not be too large, because then the wires would come into contact against one another too soon during compression, and thus prevent further compression of the lattice structure.

In summary, then, it would be advantageous to provide a lattice structure wherein its wire has a cross sectional diameter which is as small as possible, but at the same time the ratio between the thickness of the mantle material and the core material is adjusted so that on the one hand good X-ray visibility is obtained, and on the other hand, good self-expandability is obtained. These properties are dependent on the geometry of the lattice structure, in particular on the diameter of the lattice structure in the fully expanded state and the number of meshes which are distributed over the circumference of the lattice structure. This conflict of interests is in fact exacerbated by the fine mesh in the case of flow diverters, because the relatively thin wires have a relatively low radial force, so that the visibility or the proportions of platinum in braids of this type are particularly critical.

SUMMARY

In the light of the foregoing, the objective of the present invention is to provide a medical device, in particular a stent, which has a high X-ray visibility with simultaneous good self-expansion properties, wherein the medical device can be guided to the treatment site via small catheters, in particular microcatheters.

In accordance with the invention, this objective is achieved by means of the subject matter of patent claim 1.

In particular, the inventive concept is that of a medical device, in particular a flow diverter, having a radially self-expandable lattice structure which is tubular at least in some regions and which is composed of a plurality of interwoven individual wires which form meshes of the lattice structure. At least some of the individual wires have an X-ray visible core material and a superelastic mantle material. A plurality of directly adjacent meshes in the circumferential direction of the lattice structure form a mesh ring, wherein in a fully self-expanded state, the lattice structure has an expansion diameter $D_{exp}$, the mesh ring has a mesh number n, and the core material has a core diameter $d_{core}$. In accordance with the invention, for the core diameter $d_{core}$, the following holds:

$$d_{core} = f(D_{exp}/n)$$

In this regard, in accordance with the invention the following holds for a visibility factor f:

$$0.08 \leq f \leq 0.15$$

It has surprisingly been shown that in the context of the visibility factor described above, a ratio between the core diameter of the core material and the expansion diameter of the lattice structure is established, which results in the fact that the lattice structure is particularly visible under radiographic monitoring, and at the same time has a sufficiently high radial force to be able to have the desired self-expansion properties and, furthermore, a total wire diameter of the wire can be maintained which leads to particularly good compression of the lattice structure in small catheters, in particular microcatheters. As an example, the invention or the device in accordance with the invention may be used with catheters with a size of 2 Fr, 2.5 Fr and 3 Fr or more.

The direct relationship between the core diameter and the expansion diameter with the consideration of the visibility factor specified in accordance with the invention means that the correct quantity of X-ray visible core material can be selected for different medical devices which are distinguished from each other by the expansion diameter of their lattice structures. In other words, because of the inventive relationship between the core wire diameter and the expansion diameter, it is possible to select the best possible proportion of core material for different expansion diameters of the lattice structures.

In general, the invention specifies that the lattice structure is self-expandable. The wire forming the lattice structure thus preferably has superelastic properties. The lattice structure may autonomously take up a fully self-expanded state, in the case of which no external forces act on the lattice structure. Instead, the internal self-expansion forces of the lattice structure lead to expansion of the lattice structure to a maximum cross sectional diameter, the expansion diameter. This expansion diameter usually does not correspond to the cross sectional diameter assumed by the lattice structure in the implanted state. Usually, for implantation, a medical device is selected with a cross sectional diameter which is between 5% and 20%, in particular approximately 10% over the cross sectional diameter of a blood vessel into which the medical device is to be introduced. This oversizing ensures that in the implanted state, the lattice structure exerts a sufficient radial force on the vessel walls, so that the lattice structure remains firmly anchored at the implantation site. In addition, there is a danger of a modification to the porosity in the case of oversizing of the stent or flow diverter.

Under the influence of external forces, the lattice structure can be transposed into a compressed state. In this regard, the maximum compressed state is then reached when the lattice structure in fact can no longer be compressed. This usually occurs when the wire sections, which are disposed over the circumference of the lattice structure next to one another, get close enough together for the sections of the wire to touch and therefore counteract any further deformation. In other words, the fully compressed state is in particular reached when the lattice structure has been radially compressed to such an extent that the meshes of the lattice structure per se are almost no longer detectable, because the wire sections are in contact against one another.

In the fully compressed state of the lattice structure, the lattice structure preferably assumes a cross sectional diameter which is the same as or slightly smaller than the internal diameter of a catheter which is used to feed the medical device into a blood vessel. In other words, the feed diameter of the lattice structure is usually somewhat larger than the diameter of the lattice structure in the fully compressed state. In the case of an expansion diameter $D_{exp}$ of 2.0 mm≤$D_{exp}$≤3.5 mm, in particular 2.5 mm≤$D_{exp}$≤3.5 mm, the catheter has an internal diameter of 2 Fr to 2.5 Fr, in particular 2 Fr, in particular 2.5 Fr. In the case of an expansion diameter $D_{exp}$ of 3.5 mm≤$D_{exp}$≤5 mm, the catheter has an internal diameter of 2.5 Fr to 3 Fr, in particular 2.5 Fr and in particular 3 Fr. In the case of an expansion diameter $D_{exp}$ of 5 mm<$D_{exp}$, the catheter has an internal diameter of 3 Fr to 4 Fr, in particular 3 Fr, in particular 4 Fr.

A catheter size of 2 French(=2 Fr) corresponds to an internal catheter diameter of approximately 0.4 mm. 2.5 French(=2.5 Fr) corresponds to an internal catheter diameter of approximately 0.52 mm. 3 French(=3 Fr) corresponds to an internal catheter diameter of approximately 0.7 mm.

In general, in accordance with the invention, the expansion diameter of the lattice structure is preferably between 2.5 mm and 8 mm. Medical devices which have lattice structures with these sorts of dimensions are particularly suitable for the treatment of diseases in neurovascular blood vessels. In particular, medical devices of this type, which are preferably configured as implants, in particular as stents in the form of flow diverters, are suitable for the treatment of diseases in intracranial blood vessels. Above all, they are useful for the treatment of intracranial aneurysms, stenoses or dissections and other malformations of the vessels.

In a preferred embodiment of the invention, a width ratio $R_{GS}$ between the expansion diameter $D_{exp}$ and the mesh number n in the case of an expansion diameter $D_{exp}$ of between 2.5 mm and 3.5 mm is between 0.10 mm and 0.22 mm, in particular between 0.15 mm and 0.20 mm. In the case of an expansion diameter $D_{exp}$ of between 3.5 mm and 6 mm, the width ratio $R_{GS}$ between the expansion diameter $D_{exp}$ and the mesh number n is preferably between 0.15 mm and 0.25 mm, in particular between 0.18 mm and 0.22 mm, preferably approximately 0.2 mm. In the case of an expansion diameter $D_{exp}$ of between 6 mm and 7 mm, the width ratio $R_{GS}$ is between 0.2 mm and 0.30 mm, in particular between 0.22 mm and 0.25 mm.

The width ratio $R_{GS}$ has a direct influence on the width of a mesh in the circumferential direction of the lattice structure. A high ratio between the expansion diameter and the mesh number leads to a large width for the individual meshes. This has a disadvantageous effect on the stability of the lattice structure. In addition, a high mesh width may, for example when coils are introduced into an aneurysm and are retained by the lattice structure, result in them easily penetrating through the meshes. The width ratio $R_{GS}$ has an influence on the reduction of the flow rate within the aneurysm, the diversion of the blood flow into the primary lumen and on the fine-pored structure for vessel reconstruction.

Too small a ratio between the expansion diameter and the mesh number results in a small mesh width, whereupon the ability of the lattice structure to be fed through a catheter becomes more difficult and the blood flow in side branches could be disrupted.

Surprisingly, it has been shown that the values given above for the ratio between the expansion diameter and the mesh number provides a good compromise, so that the lattice structures with this configuration on the one hand have a sufficiently high stability and on the other hand can easily be fed through a catheter. In addition, a good flow effect is obtained. Medical devices configured in this manner are also easy to anchor in a vessel and in this manner, the flow effect is improved and at the same time, they are also easy to feed, even through tortuous blood vessels, to the treatment site.

In accordance with the invention, in preferred embodiments, in addition, a braiding angle α of the lattice structure is between 70° and 80°, in particular approximately 75°. The braiding angle influences the mechanical expansion behaviour of the lattice structure and the porosity. In addition, the braiding angle influences the bending flexibility and the ability of the medical device to be fed through catheters. For the treatment of intracranial vessels, a braiding angle of between 70° and 80°, in particular approximately 75°, has been shown to be particularly preferred.

In the context of the present application, the braiding angle is defined as that angle which is between the wire of a mesh and the longitudinal axis of the lattice structure. Specifically, in order to determine the braiding angle, the longitudinal axis of the lattice structure is projected into the circumferential plane of the lattice structure and then the angle to a wire which runs helically over the curved surface of the lattice structure is determined. In this regard, the braiding angle is distinct from the mesh angle, which is between two intersecting sections of wire. In the context of the present application, the mesh angle corresponds to twice the braiding angle.

In order to obtain good compressibility, it has been shown to be particularly advantageous for the wire to have a wire diameter $d_{wire}$ which is:

in the case of an expansion diameter $D_{exp}$ of between 2.5 mm and 4.5 mm i.e. 2.5 mm $D_{exp}$ 4.5 mm: 30 µm≤$d_{wire}$≤<46 µm, and in the case of an expansion diameter $D_{exp}$ of between more than 4.5 mm and 8 mm, i.e. 4.5 mm<<$D_{exp}$≤8 mm: 46 µm<$d_{wire}$≤65 µm.

In connection with the number of meshes over the circumference of the lattice structure in the case of a pre-specified expansion diameter and a pre-specified braiding angle for the lattice structure, the wire diameter also determines the ratio between the proportion of wire on the circumferential surface of the lattice structure with respect to the proportion of openings. This ratio between the proportion of wire material on the circumferential surface of the lattice structure over the entire curved surface of the lattice structure is defined as the braid density.

The ratio between the surface area of the openings, i.e. the mesh area, and the total stent curved surface is defined as the porosity. The wire diameter has a direct influence on the braid density or porosity of the braiding. In addition, the wire diameter influences the radial force of the lattice structure and its ability to be fed through small catheters.

It has been shown that for the expansion diameters specified above, the specified wire diameters have been shown to be particularly advantageous, i.e. on the one hand to provide a sufficiently high radial force and on the other hand, to provide a good ability to be fed through catheters. In addition, with these wire diameters, a particularly advantageous braid density or porosity is obtained for the treatment of intracranial blood vessels.

The braiding angle also has an influence on the porosity of the lattice structure. With the values given above for a braiding angle in combination with the wire diameter values specified above, a particularly advantageous porosity is obtained.

In order to ensure that the lattice structure of the medical device in accordance with the invention has good self-expansion capabilities, advantageously, the mantle material of the wire has a thickness which is at least 10 µm, in particular at least 15 µm, in particular 10 µm to 20 µm. It has been shown that independently of the expansion diameter of the lattice structure, a specific minimum thickness for the mantle material is necessary in order to obtain sufficiently good self-expansion properties.

A minimum value of 10 µm as the thickness of the mantle material has been shown to be particularly advantageous in order to obtain the desired self-expansion properties. The mantle material not only permits an improvement to the self-expansion properties of the lattice structure, but also forms a good protection against corrosion and protects against abrasion because of its particular hardness.

In the case of overall thicker wires, a higher minimum thickness for the mantle material may be provided. As an example, wires with a total thickness of at least 50 µm, in particular at least 60 µm, may have a mantle material with a thickness of at least 15 µm. Furthermore, in order to additionally obtain good visibility properties for the lattice structure, advantageously, the volume of the core material takes up a specific percentage of the total volume of the wire.

Preferably, the volume of the core material takes up a percentage of the total volume of the wire, wherein in the case of a visibility factor f of 0.08 to 0.15, the percentage of the total volume is 13% to 45%, in particular 15% to 40%.

Preferably, in the case of a visibility factor f of 0.08, the percentage of the total volume is 15% to 25%, in particular 18% to 22%. Preferably, in the case of a visibility factor f of 0.1, the percentage of the total volume is 15% to 30%, in particular 20% to 25%. Preferably, in the case of a visibility factor f of 0.12, the percentage of the total volume is 20% to 35%, in particular 25% to 30%. Preferably, in the case of a visibility factor f of 0.15, the percentage of the total volume is 25% to 45%, in particular 30% to 40%.

The visibility factor f of 0.12 or 0.15 is suitable for larger dimensions beyond an expansion diameter of 3.5 mm. The visibility factor f of 0.08 is suitable for smaller dimensions with an expansion diameter of between 2.5 and 3.5 mm.

Preferably, the lattice structure has closed loops at one longitudinal axial end and open wires with free ends at the other longitudinal axial end. In addition, between 1 and 4 loops are double wires which have the same diameter or different diameters as with the remaining individual wires of the lattice structure, i.e. as with the "standard wires". In this case, the proportion of platinum may also be different.

For good X-ray visibility of the medical device, it has been shown to be particularly advantageous for the core material of the wire to consist of platinum or a platinum alloy. As an alternative, the core material may consist of tantalum or a tantalum alloy. Other suitable materials are gold, silver, tungsten and/or niobium, as well as alloys thereof.

Preferably, the mantle material consists of a nickel-titanium alloy, in particular nitinol. In particularly preferred variations, the nickel-titanium alloy may have a proportion of nickel of 50.8 as an atomic percentage.

The surface of the mantle material may comprise an oxide layer. In particular, an oxide layer may be provided with a layer thickness of between 50 nm and 500 nm, in particular between 100 nm and 400 nm, in particular between 200 nm and 350 nm. The oxide layer enables the wire sections to slide on each other properly and thus promotes the self-expansion properties of the lattice structure.

In one embodiment, the following holds for the visibility factor f:

0.08≤f≤0.14, in particular 0.08≤f≤0.13, in particular 0.08≤f≤0.12, in particular 0.08≤f≤0.11, in particular f=approximately 0.1.

Preferably, the proportion of the individual wires with the X-ray visible core material and the superelastic mantle material with respect to the total number of individual wires is at least 50%, in particular at least 75%, in particular 100%.

100% means that all of the individual wires are respectively produced from X-ray visible core material and superelastic mantle material.

Preferably, the mesh number n for a mesh ring in the case of an expansion diameter $D_{exp}$ of 2.5 mm to 4.5 mm, i.e. 2.5 mm$\leq D_{exp} \leq$4.5 mm, is: 12$\leq$n$\leq$24, in particular 16$\leq$n$\leq$24. In the case of an expansion diameter $D_{exp}$ of more than 4.5 mm to 8 mm, i.e. 4.5 mm$<D_{exp}\leq$8 mm, the mesh number n of a mesh ring is 24<n$\leq$36, in particular 24<n$\leq$32.

In one aspect, the invention provides a kit with a medical device as described above and a catheter, wherein in a compressed state, the medical device can be disposed in the catheter by displacing it longitudinally. In addition, the kit may comprise a transport wire, wherein the medical device can be connected to or is connected to the transport wire, and in particular is releasably connected thereto. Preferably, the catheter contained in the kit has an internal diameter which is at most 0.7 mm, in particular at most 0.6 mm, in particular at most 0.5 mm, in particular at most 0.4 mm.

BRIEF DESCRIPTION OF THE DRAWINGS

The invention will now be described in more detail with the aid of an exemplary embodiment and with reference to the accompanying diagrammatic drawings, in which.

DESCRIPTION

The exemplary embodiment of a medical device in accordance with the invention represented in the figures is a flow diverter which is suitable for treatment in intracranial blood vessels. In general, the medical device may be configured as a medical instrument or as a medical implant. In any event, the medical device can preferably be fed through a catheter in a minimally invasive manner to a treatment site, in particular within a blood vessel.

Medical implants, in contrast, remain substantially permanently at their treatment site. Implants of this type are flow diverters which are used for the treatment of aneurysms in blood vessels.

The flow diverter represented in the accompanying drawings is preferably suitable for the treatment of aneurysms in intracranial blood vessels. The flow diverter has a tubular, radially expandable lattice structure 10 produced from a plurality of interwoven individual wires 11 which form the meshes 12 of the lattice structure 10.

The lattice structure 10 is highly compressible and can therefore be guided through small catheters to the treatment site. The lattice structure 10 has a high bending flexibility, so that feeding and anchoring in highly tortuous blood vessels is readily facilitated.

Figure 1:
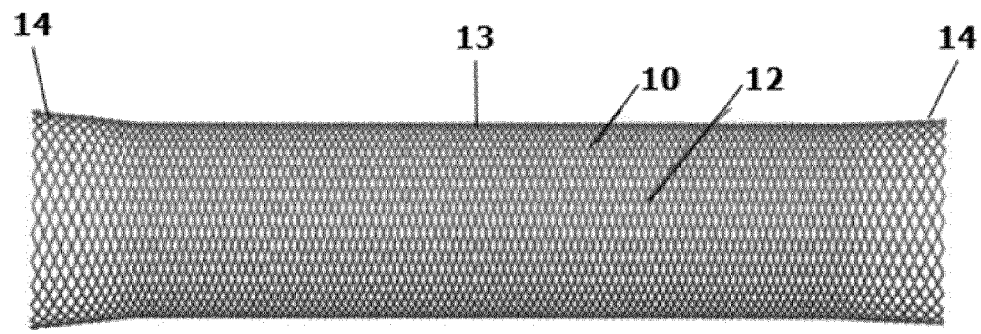
FIG. 1: shows a diagrammatic side view of a medical device, in particular of a flow diverter according to an exemplary embodiment in accordance with the invention.

As can be seen in FIG. 1, the lattice structure 10 has a plurality of meshes 12 which respectively form mesh rings 13 when viewed in the circumferential direction of the lattice structure 10. A mesh ring 13 is formed from a plurality of meshes 12 which are disposed directly adjacent to one another in the circumferential direction of the lattice structure. In this regard, the individual meshes are separated from each other by intersections 18 of the individual wires 11.

The lattice structure 10 is constructed from a plurality of mesh rings 13 which are directly adjacently disposed in the longitudinal direction of the lattice structure 10. Preferably, each mesh ring 13 has an even number of meshes 12. In particular, the mesh ring 13 may have 12, 14, 16, 32 or more meshes.

The lattice structure 10 is self-expandable and expands autonomously without the influence of external forces. In this unloaded state, the lattice structure 10 takes up the expansion diameter $D_{exp}$. In a fully expanded state, then, the lattice structure 10 has the expansion diameter $D_{exp}$.

In contrast, the action of an external force is necessary in order to transpose the lattice structure 10 into a compressed state. A state in which the lattice structure 10 takes up its smallest possible diameter is the fully compressed state. In this fully compressed state, the lattice structure 10 has a compression diameter $D_{comp}$. Upon compression of the lattice structure 10, the width of a mesh 12 reduces in the circumferential direction of the lattice structure 10. This reduction in the width occurs until the sections of wire which border the meshes 12 are in contact with one another. The wire 11 then blocks any further compression of the lattice structure 10. For mechanical or geometrical reasons, then, the lattice structure 10 cannot simply be compressed to any desired extent, but takes up a minimum diameter beyond which any further compression is no longer possible. This state forms the fully compressed state in which the lattice structure 10 has a compression diameter $D_{comp}$.

A compression diameter $D_{comp}$ which is as small as possible is advantageous in order to be able to feed the lattice structure 10 to the treatment site through a catheter which is as small as possible. In this regard, in particular, the lattice structure is provided so as to be compressible or so that it can take up such a compression diameter $D_{comp}$ such that the lattice structure can be guided to the treatment site through a catheter with an internal diameter of at most 3 French, in particular 2.5 French, in particular at most 2 French. Specifically, the lattice structure may take up a compression diameter $D_{comp}$ which is at most 0.7 mm, in particular 0.6 mm, in particular at most 0.51 mm, in particular at most 0.42 mm.

At least one individual wire 11 of the lattice structure 10 is formed as a composite wire. A plurality of individual wires 11, in particular a portion, for example 50% or 75%, of all individual wires 11 or in fact all individual wires 11, i.e. 100% of the individual wires 11, may each be produced as composite wires.

In this regard, the individual wires 11 have an X-ray visible core material 11a and a superelastic mantle material 11b. The core material 11a may in particular be composed of platinum, a platinum alloy, tantalum and/or a tantalum alloy. In each case, the core material 11a preferably has an enhanced visibility under X-rays. This means that the entire lattice structure 10 can easily be detected by the operator during implantation.

In contrast, the mantle material 11b acts to provide the self-expansion properties of the lattice structure 10. To this end, the mantle material 11b has superelastic properties. In particular, the mantle material may be formed by a shape memory material which takes up a previously set shape under the influence of the environmental temperature. A shape memory material of this type may in particular be formed by a nickel-titanium alloy. Preferably, the mantle material 11b is tailored such that upon reaching the body temperature of a human being, it urges the lattice structure 10 into the fully expanded state.

Depending on the desired size of the lattice structure 10 or of the medical device, in particular the stent, advantageously, the diameter of the core material, the core diameter $d_{core}$, is tailored accordingly. In particular, the self-expansion properties, the compressibility and the X-ray visibility of the lattice structure 10 should be matched to the best possible extent. In this regard, it has been shown that an advantageous core diameter $d_{core}$ for different expansion diameters $D_{exp}$ is one given by the product of the quotients from the expansion diameter $D_{exp}$ and the mesh number n of the meshes 12 of the mesh ring 13 as well as a visibility factor f. The visibility factor f is at least 0.08 and at most 0.15, in particular at most 0.12.

Specifically, it has been shown that a core diameter calculated using the foregoing parameters results in good X-ray visibility of the lattice structure 10, wherein the lattice structure 10 can also self-expand properly and can be compressed to a small compression diameter. In this regard, the following formula holds:

$$d_{core} = f \cdot (D_{exp}/n)$$

for lattice structures 10 with different expansion diameters $D_{exp}$.

In particular, the calculation of the core diameter $d_{core}$ is made using this formula and leads to good parameters for lattice structures 10 which have an expansion diameter $D_{exp}$ between 2.5 mm and 8 mm. Such lattice structures 10 are particularly suitable for use in intracranial blood vessels.

In order to obtain good compressibility for the lattice structure 10, in the exemplary embodiments described here, the wire 11 particularly advantageously has a total wire diameter $d_{wire}$ of at most 65 µm, in particular at most 60 µm, in particular at most 55 µm, in particular at most 40 µm. In particular, the wire 11 may have a wire diameter $d_{wire}$ of between 30 µm and 65 µm, preferably between 40 µm and 50 µm. Specifically, the wire diameter $d_{wire}$ may be 40 µm or 45 µm or 50 µm. Wires of this thickness enable particularly good compression of the lattice structure 10, and therefore give rise to a very small compression diameter $D_{comp}$. This ensures that the lattice structure 10 can be guided smoothly through small catheters to the treatment site.

For lattice structures 10 with an expansion diameter $D_{exp}$ of between 2.5 mm and 3.5 mm, wire diameters $d_{wire}$ of between 30 µm and 40 µm have been shown to be advantageous. For lattice structures 10 with an expansion diameter $D_{exp}$ of between 3.5 mm, in particular 4 mm, and 5.5 mm, wire diameters $d_{wire}$ of between 30 µm, in particular 38 µm, more particularly more than 40 µm, and 50 µm, have been shown to be advantageous. For lattice structures 10 with an expansion diameter $D_{exp}$ of between 5.5 mm, in particular 7 mm, and 8 mm, wire diameters $d_{wire}$ of between 42 µm, in particular 46 µm, and 65 µm have been shown to be advantageous.

Figure 3:
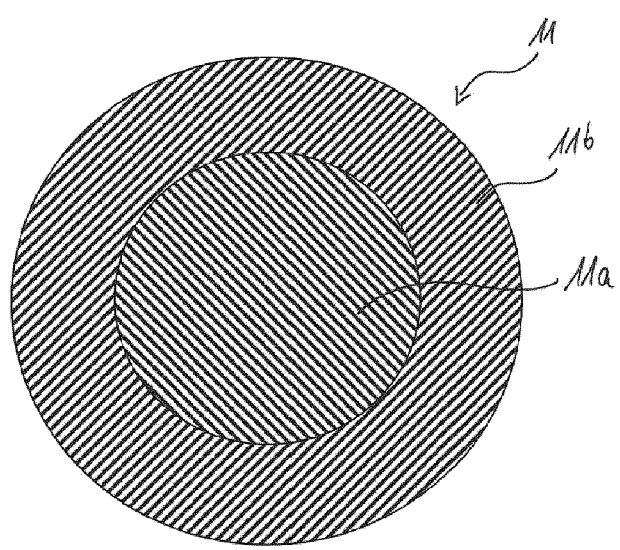
FIG. 3: shows a diagrammatic view of a cross sectional profile of an individual wire of the medical device in accordance with FIG. 1.

It has also been shown that as regards the self-expansion properties of the lattice structure 10, an advantageous wire 11 is one in which the mantle material has a thickness h of at least 10 µm. In the case of a wire diameter $d_{wire}$ of 40 µm, this produces a maximum possible core diameter of 20 µm. FIG. 3 clearly shows that by means of a thickness h of 10 µm for the man material 11b with a wire diameter $d_{wire}$ of 40 µm, a core diameter $d_{core}$ of at most 20 µm remains for the core material 11a. The lower limit for the thickness h of the mantle material may also be at least 15 µm.

The percentage volume of the core material 11a with respect to the total volume of an individual wire 11 can be calculated from the preceding geometrical information. This substantially corresponds to the quotient between the square of the ratio between the product of the visibility factor f and the mesh width b to the square of the wire diameter $d_{wire}$. The mesh width b is produced from the ratio between the expansion diameter $D_{exp}$ and the mesh number n. Specifically, the volume fraction φ of the core material 11a can be calculated as follows:

$$\varphi = (f \cdot D_{exp}/n)^2 / d_{wire}^2$$

Expressed as a percentage, this means that in the case of a visibility factor f of 0.08, the percentage volume φ of the core material 11a with respect to the total volume of the wire 11 is from 15% to 25%, in particular from 18% to 22%. Preferably, in the case of a visibility factor f of 0.01, the percentage fraction of the total volume is from 15% to 30%, in particular from 20% to 25%. Preferably, in the case of a visibility factor f of 0.12, the percentage fraction of the total volume is from 20% to 35%, in particular from 25% to 30%. Preferably, in the case of a visibility factor f of 0.15, the percentage fraction of the total volume is from 25% to 45%, in particular from 30% to 40%.

Figure 2:
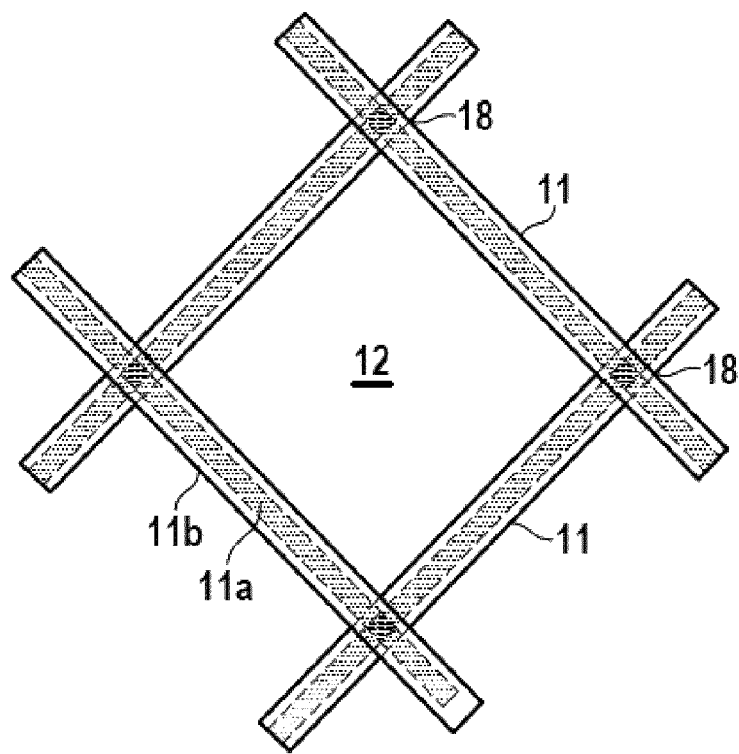
FIG. 2: shows a diagrammatic view of a mesh of the lattice structure of the medical device according to FIG. 1.

FIG. 2 shows a section of the lattice structure 10 of the medical device or stent in accordance with FIG. 1. Specifically, FIG. 1 shows an individual mesh 12 of the lattice structure 10 which is bordered by wire sections of a plurality of individual wires 11. As is usually the case with braided lattice structures 10, the mesh 12 is rhomboidal.

FIG. 2 also clearly shows how the individual wire 11 is constructed as a composite wire. In particular, for the purposes of illustration, it can be seen that the core material 11a runs through the individual wire 11 and is sheathed by the mantle material 11b. Under radiographic monitoring, the core material 11a in particular can be detected, because the radiographic density is particularly high in the region of the intersections 18 of the individual wires 11. Thus, the intersections 18 are particularly easy to detect under radiographic monitoring.

The braiding angle a of the lattice structure 10 in the embodiment shown is preferably between 70 and 80 degrees, preferably 75 degrees, wherein a tolerance of ±3 degrees is acceptable. The braiding angle a in the context of the present application is that angle which is between a longitudinal axis of the lattice structure 10 and the individual wire 11. In this regard, the individual wire 11 is wound in a helical manner about the longitudinal axis. This is the case for all of the individual wires.

In general, the invention is based on the following considerations:

For a product series of medical devices, in particular stents, the lattice structure of which respectively have substantially the same construction, but wherein the individual products differ in their expansion diameter $D_{exp}$, it is sensible to raise the mesh number n of the individual rows of meshes 13 with increasing expansion diameter $D_{exp}$.

The width b of the individual mesh can in general be calculated from the expansion diameter $D_{exp}$ and the mesh number n as follows:

$$b = \pi D_{exp}/n$$

In the context of the present application, the ratio $D_{exp}/n$ between the expansion diameter $D_{exp}$ and the mesh number n is defined as the width ratio $R_{GS}$.

In the case of a high width ratio $R_{GS}$, the individual meshes are comparatively wide. This has the disadvantage that embolic material such as coils in an aneurysm are difficult to retain with the lattice structure 10.

In the case of a small width ratio $R_{GS}$, in contrast, the mesh width b is small. This means that the lattice structure 10 is less flexible in bending, so that navigation of the medical device through a catheter is made more difficult. In addition, a small mesh width b means that microcatheters which are used to introduce coils into an aneurysm can only be guided through the meshes with difficulty.

Thus, advantageously, a mesh width b is provided which reaches a compromise between the properties of a flow diverter which are important for aneurysm treatment (see above) and good navigability of the lattice structure 10. In this regard, it has been shown that a width ratio $R_{GS}$ in the range from 0.1 mm to 0.3 mm provides good results. Multiplying by $\pi$ produces a preferred mesh width b of between 0.3 mm and 0.9 mm.

The width ratio $R_{GS}$ between the expansion diameter $D_{exp}$ and the mesh number n in the case of an expansion diameter $D_{exp}$ of between 2.5 mm and 3.5 mm is between 0.10 mm and 0.22 mm, in particular between 0.15 mm and 0.20 mm. In the case of an expansion diameter $D_{exp}$ of between 3.5 mm and 6 mm, the width ratio $R_{GS}$ between the expansion diameter $D_{exp}$ and the mesh number n is preferably between 0.15 mm and 0.25 mm, in particular 0.18 mm and 0.22 mm, preferably approximately 0.2 mm. In the case of an expansion diameter $D_{exp}$ of between 6 mm and 7 mm, the width ratio $R_{GS}$ is between 0.2 mm and 0.30 mm, in particular between 0.22 mm and 0.25 mm.

The braiding angle a influences the mechanical expansion behaviour, the flexibility and the feedability of the medical device. A braiding angle a of between 70° and 80°, preferably 75°, has been shown to be suitable for the treatment of intracranial blood vessels by medical devices with a lattice structure 10 which have an expansion diameter $D_{exp}$ of between 2.5 mm and 8 mm.

In the case of a pre-specified width ratio $R_{GS}$ and, as a consequence, of a pre-specified mesh width b as well as a pre-specified braiding angle a, the mesh 12 has a rhomboidal shape and size which, in combination with the wire diameter $d_{wire}$, results in a braid density or a porosity. In this regard, the braid density provides the proportion of the total curved surface of the lattice structure which is formed by the wire 11, i.e. minus the area of the openings of the meshes 12. In contrast, the porosity provides the proportion of the total curved surface of the lattice structure which is formed by the sum of the opening areas of the meshes 12. In addition, the width ratio $R_{GS}$ influences the maximum inscribed circle diameter of the mesh 12, which is also defined as the "pin opening".

The wire diameter $d_{wire}$ together with the braiding angle a and the width ratio $R_{GS}$ influence the braid density or the porosity of the lattice structure 10 and in addition has an effect on the radial force and the feedability of the medical device. The following wire diameters $d_{wire}$ have been shown to be advantageous for different expansion diameters $D_{exp}$:

in the case of an expansion diameter $D_{exp}$ of between 2.5 mm and 4.5 mm i.e. 2.5 mm≤$D_{exp}$≤4.5 mm: 30 µm≤$d_{wire}$≤46 µm, and in the case of an expansion diameter $D_{exp}$ of between more than 4.5 mm and 8 mm, i.e. 4.5 mm<$D_{exp}$≤8 mm: 46 µm<$d_{wire}$<65 µm.

The length of the lattice structure 10 is preferably between 10 mm and 50 mm.

For good X-ray visibility, the wire 11 has an X-ray visible core material 11a *with a core diameter $d_{core}$*. When selecting the core diameter $d_{core}$, the size of the individual meshes 12 plays an important role. The wider and longer are the meshes 12, the lower is the braid density of the lattice structure 10. A high core diameter $d_{core}$ for the wire 11 means that it can be detected easily under radiographic monitoring.

In particular, the mesh width b influences the spacing between the intersections 18 of a mesh row 13. The crossing sections of the wire 11 overlap at the intersections 18 and therefore form regions with an enhanced radiographic density. The further apart the intersections 18 are, the larger the core diameter $d_{core}$ should be in order to ensure good visibility of the lattice structure 10. In particular, a high number of intersections not only makes the surface of the lattice structure 10 easy to detect; the shape of the lattice structure 10 which fits itself to the vessel wall can also be detected.

The width ratio $R_{GS}$ determines the density of the intersections 18 of a mesh row 13. The smaller the width ratio $R_{GS}$, the smaller is the separation of the intersections 18 and the higher is the braid density of the lattice structure 10.

In the case of a high width ratio $R_{GS}$, a relatively larger core diameter $d_{core}$ is advantageous. For a small width ratio $R_{GS}$, a correspondingly smaller core diameter $d_{core}$ is sufficient.

It has been shown that a ratio between the core diameter $d_{core}$ and the width ratio $R_{GS}$ of between 0.08 and 0.15, in particular 0.10, more particularly 0.12, produces good results. The aforementioned ratio in the context of the present application is defined as the visibility factor f.

In the case of a visibility factor f of 0.08, for a width ratio $R_{GS}$ of between 0.17 and 0.20, an advantageous core diameter $d_{core}$ of between 13.3 µm and 16 µm is produced. For a larger width ratio $R_{GS}$, the core diameter $d_{core}$ can be raised up to 20 µm.

In the case of a visibility factor f of 0.10, for a width ratio $R_{GS}$ of between 0.17 mm and 0.20 mm, an advantageous core diameter $d_{core}$ of between 16.7 µm and 20 µm is obtained.

In order to ensure a sufficient torsion resistance and thus a suitable restoring force in the case of spring-like deformation of the wire 11, advantageously, the mantle material 11b has a thickness h which is at least 10 µm. In the case of the maximum wire diameter $d_{wire}$ of approximately 60 µm, this then produces an upper limit for the core diameter $d_{core}$ of approximately 40 µm.

In the case of an expansion diameter $D_{exp}$ of 3.5 mm and a preferred wire diameter $d_{wire}$ of 38 µm, the core diameter $d_{core}$ must not be more than 18 µm, because otherwise, the proportion of mantle material 11b would be too low. Thus, in order to obtain this, a visibility factor of 0.08 or 0.10 should be selected. In the case of a larger expansion diameter $D_{exp}$, the preferred wire diameter $d_{wire}$ is approximately 50 µm, for example. For lattice structures 10 of this type, the core diameter $d_{core}$ can therefore be up to 30 µm. In the case of a lattice structure 10 with an expansion diameter $D_{exp}$ of 6 mm, therefore, a larger visibility factor f of up to 0.15 would be possible.

A visibility factor f of 0.08 may be used when the width ratio $R_{GS}$ is low or the wire diameter $d_{wire}$ is high.

By selecting a suitable visibility factor f, a percentage of the volume of the core material 11a with respect to the total volume of the wire 11 is produced. Preferably, in the case of a visibility factor f of 0.08, the percentage volume of the core material with respect to the total volume is 15% to 25%, in particular 18% to 22%. Preferably, in the case of a visibility factor f of 0.1, the percentage of the total volume is 15% to 30%, in particular 20% to 25%. Preferably, in the case of a visibility factor f of 0.12, the percentage of the total volume is 20% to 35%, in particular 25% to 30%. Preferably, in the case of a visibility factor f of 0.15, the percentage of the total volume is 25% to 45%, in particular 30% to 40%.

In this regard, it has been shown that for the following wire diameters $d_{wire}$, the following core diameters $d_{core}$ are preferred:

For $d_{wire}$=45 μm: $d_{core}$=from 22 μm to 28 μm, in particular approximately 25 μm.

For $d_{wire}$=50 μm: $d_{core}$=from 24 μm to 35 μm, in particular from 26 μm to 32 μm, in particular approximately 27 μm or approximately 32 μm.

For $d_{wire}$=55 μm: $d_{core}$=from 27 μm to 38 μm, in particular from 29 μm to 36 μm, in particular approximately 30 μm or approximately 35 μm.

For the following expansion diameters $D_{exp}$ for the lattice structure, the following wire diameters $d_{wire}$ are advantageous:

Expansion diameter $D_{exp}$ of 2.5 mm to 4.5 mm: wire diameter ($d_{wire}$ of 30 μm to 46 μm, in particular 34 μm to 42 μm;

Expansion diameter $D_{exp}$>4.5 mm to 6 mm: wire diameter $d_{wire}$ of 42 μm to 55 μm, in particular 46 μm to 50 μm;

Expansion diameter $D_{exp}$>6 mm to 8 mm: wire diameter $d_{wire}$ of 42 μm to 65 μm, in particular from 50 μm to 60 μm.

The preferred thickness h of the mantle material is calculated as follows:

$$h=(d_{wire}-d_{core})/2$$

Thus, the mantle material 11b has a thickness h which for the aforementioned preferred wire diameter $d_{wire}$ is at least 9 μm (in the case of $d_{wire}$=50 μm and $d_{core}$=31.6 μm) and at most 12.4 μm (in the case of $d_{wire}$=55 μm and $d_{core}$=30.1 μm).

In respect of the mesh number n, preferably, lattice structures 10 with an expansion diameter $D_{exp}$ of between 2.5 mm and 8.0 mm preferably have approximately 12 to 36 meshes 12, in particular 16 to 32 meshes 12, per mesh ring 13.

Lattice structures 10 with an expansion diameter $D_{exp}$ of between 2.5 mm and 3.5 mm preferably have 16 to 20 meshes 12 per mesh ring 13. In the case of lattice structures 10 with an expansion diameter $D_{exp}$ of between 3.5 mm and 5.0 mm, mesh rings 13 with respectively 20 to 26 meshes may be provided. Lattice structures 10 with an expansion diameter $D_{exp}$ of between 5.0 mm and 8 mm preferably have a mesh number n of 26 to 32.

REFERENCE NUMERALS 10 lattice structure
11 wire
11a core material
11b mantle material
12 meshes
13 mesh ring
14 longitudinal end
15 free
16 free
17 free
18 intersection
$D_{exp}$ expansion diameter
$D_{comp}$ compression diameter
$d_{core}$ core diameter
$d_{wire}$ wire diameter
b mesh width
f visibility factor
h thickness of mantle material 11b
$R_{GS}$ width ratio
a braiding angle
β mesh angle
n mesh number
φ percentage by volume

The invention claimed is:

1. A medical device comprising:
a radially self-expandable lattice structure composed of a plurality of interwoven individual wires, wherein at least some of the individual wires have an X-ray visible core material and a superelastic mantle material, the individual wires forming meshes of the lattice structure that is tubular at least in some regions;
wherein the lattice structure includes a plurality of directly adjacent meshes in a circumferential direction of the lattice structure to form a mesh ring, and
wherein in a fully self-expanded state, a core diameter ($d_{core}$) of the core material equals a visibility factor (f) multiplied by a ratio of an expansion diameter ($D_{exp}$) in a range from 2.5 mm to 8 mm of the lattice structure over a mesh number (n) of the mesh ring, expressed as $d_{core}$=f·($D_{exp}$/n), wherein the visibility factor varies in a range from 0.08 to 0.15.

2. The medical device according to claim 1, wherein a braiding angle of the lattice structure is between 70° and 80°.

3. The medical device according to claim 1, wherein a wire diameter of each wire is one of,
between 30 μm and 46 μm, in case of the expansion diameter of 2.5 mm to 4.5 mm, or
between 46 μm and 65 μm, in the case of the expansion diameter of more than 4.5 mm to 8 mm.

4. The medical device according to claim 1, wherein the mantle material has a thickness from 10 μm to 20 μm.

5. The medical device according to claim 1, wherein a volume of the core material takes up a percentage of a total volume of each wire, wherein the percentage of the total volume is from 13% to 45% in case of the visibility factor of 0.08 to 0.15.

6. The medical device according to claim 1, wherein a volume of the core material takes up a percentage of a total volume of each wire, wherein the percentage of the total volume is from 15% to 25% in case of the visibility factor of 0.08.

7. The medical device according to claim 1, wherein a volume of the core material takes up a percentage of a total volume of each wire, wherein the percentage of the total volume is from 15% to 30% in case of the visibility factor of 0.1.

8. The medical device according to claim 1, wherein a volume of the core material takes up a percentage of a total volume of each wire, wherein the percentage of the total volume is from 20% to 35% in case of the visibility factor of 0.12.

9. The medical device according to claim 1, wherein a volume of the core material takes up a percentage of a total volume of each wire, wherein the percentage of the total volume is from 25% to 45% in case of the visibility factor of 0.15.

10. The medical device according to claim 1, wherein the lattice structure in a fully compressed state has a compression diameter of at most 0.7 mm.

11. The medical device according to claim 1, wherein the mesh number for the mesh ring is one of,
between 12 and 24, in case of the expansion diameter of 2.5 mm to 4.5 mm, or
between 24 and 36, in the case of the expansion diameter of more than 4.5 mm to 8 mm.

12. A medical device comprising:
a radially self-expandable lattice structure composed of a plurality of interwoven individual wires, wherein at least some of the individual wires have an X-ray visible core material and a superelastic mantle material, the individual wires forming meshes of the lattice structure that is tubular at least in some regions, wherein the lattice structure has closed loops at one longitudinal axial end and open wire ends at another longitudinal axial end;
wherein the lattice structure includes a plurality of directly adjacent meshes in a circumferential direction of the lattice structure to form a mesh ring, and
wherein in a fully self-expanded state, a core diameter ($d_{core}$) of the core material equals a visibility factor (f) multiplied by a ratio of an expansion diameter ($D_{exp}$) in a range from 2.5 mm to 8 mm of the lattice structure over a mesh number (n) of the mesh ring, expressed as $d_{core}=f\cdot(D_{exp}/n)$, wherein the visibility factor varies in a range from 0.08 to 0.15.

13. The medical device according to claim 12, wherein the core material comprises one of platinum, a platinum alloy, tantalum, or a tantalum alloy.

14. The medical device according to claim 12, wherein the mantle material comprises a nickel-titanium alloy.

15. The medical device according to claim 12, wherein the visibility factor is between 0.08 and 0.14.

16. The medical device according to claim 12, wherein a proportion of the individual wires having the X-ray visible core material and the superelastic mantle material with respect to a total number of the individual wires is at least 50%.

17. The medical device according to claim 12, wherein the medical device is configured to be disposed in a catheter by compressing the medical device and displacing the medical device longitudinally.

18. The medical device according to claim 17, wherein the medical device is configured to connect to a transport wire.

19. A medical device comprising:
a radially self-expandable lattice structure composed of a plurality of interwoven individual wires, wherein at least some of the individual wires have an X-ray visible core material and a superelastic mantle material, the individual wires forming meshes of the lattice structure that is tubular at least in some regions;
wherein the lattice structure includes a plurality of directly adjacent meshes in a circumferential direction of the lattice structure to form a mesh ring,
wherein in a fully self-expanded state, a core diameter ($d_{core}$) of the core material equals a visibility factor (f) multiplied by a ratio of an expansion diameter ($D_{exp}$) in a range from 2.5 mm to 8 mm of the lattice structure over a mesh number (n) of the mesh ring, expressed as $d_{core}=f\cdot(D_{exp}/n)$, wherein the visibility factor varies in a range from 0.08 to 0.15,
wherein the medical device is configured to be disposed in a catheter by displacing the medical device longitudinally, and
wherein an internal diameter of the catheter is selected from one of,
2 Fr to 2.5 Fr, in case of an expansion diameter of 2.0 mm to 3.5 mm,
2.5 Fr to 3 Fr, in the case of an expansion diameter of 3.5 mm to 5 mm, or
3 Fr to 4 Fr, in the case of an expansion diameter of greater than 5 mm.

* * * * *